(12) United States Patent
Sallee

(10) Patent No.: US 11,461,594 B2
(45) Date of Patent: Oct. 4, 2022

(54) TRANSFORM DISENTANGLING AUTO-ENCODER AND RELATED METHODS

(71) Applicant: Raytheon Company, Waltham, MA (US)

(72) Inventor: Philip A. Sallee, South Riding, VA (US)

(73) Assignee: Raytheon Company, Waltham, MA (US)

( * ) Notice: Subject to any disclaimer, the term of this patent is extended or adjusted under 35 U.S.C. 154(b) by 245 days.

(21) Appl. No.: 16/826,849

(22) Filed: Mar. 23, 2020

(65) Prior Publication Data

US 2021/0295105 A1    Sep. 23, 2021

(51) Int. Cl.
| | | |
|---|---|---|
| *G06K 9/62* | (2022.01) | |
| *G06N 3/08* | (2006.01) | |
| *G06T 9/00* | (2006.01) | |
| *G06N 3/04* | (2006.01) | |

(52) U.S. Cl.
CPC ......... *G06K 9/6259* (2013.01); *G06K 9/6228* (2013.01); *G06K 9/6232* (2013.01); *G06N 3/0454* (2013.01); *G06N 3/088* (2013.01); *G06T 9/002* (2013.01)

(58) Field of Classification Search
CPC .. G06K 9/6259; G06K 9/6228; G06K 9/6232; G06N 3/0454; G06N 3/088; G06T 9/002
See application file for complete search history.

(56) References Cited

U.S. PATENT DOCUMENTS

| | | | |
|---|---|---|---|
| 8,831,358 B1 | 9/2014 | Song et al. | |
| 10,242,035 B1 | 3/2019 | Asman et al. | |
| 10,248,663 B1 | 4/2019 | Keisler et al. | |
| 2019/0205331 A1 | 7/2019 | Cevahir | |
| 2019/0393903 A1* | 12/2019 | Mandt | H03M 1/00 |
| 2020/0258196 A1* | 8/2020 | Kokura | G06N 3/04 |

(Continued)

FOREIGN PATENT DOCUMENTS

| | | |
|---|---|---|
| CN | 107516113 A | 12/2017 |
| CN | 109885709 A | 6/2019 |
| EP | 3300002 A1 | 3/2018 |

OTHER PUBLICATIONS

Transform Invariant Auto-encoder, Matsuo et al, 2017; https://arxiv.org/pdf/1709.03754.pdf (Year: 2017).*

(Continued)

*Primary Examiner* — Jianxun Yang
(74) *Attorney, Agent, or Firm* — Schwegman Lundberg & Woessner, P.A.

(57) ABSTRACT

Discussed herein are devices, systems, and methods for disentangling static and dynamic features of content. A method can include encoding by a transform disentangling autoencoder (AE), first content to generate first static features and first dynamic features and second content to generate second static features and second dynamic features, and constructing, by the AE, third content based on a combination of third static features and the first dynamic features and fourth content based on a combination of fourth static features and the second dynamic features, the third and fourth static features being determined based on the first static features and the second static features.

20 Claims, 7 Drawing Sheets

(56) References Cited

U.S. PATENT DOCUMENTS

2021/0177373 A1\* 6/2021 Xie .................. A61B 8/469

OTHER PUBLICATIONS

Han, Xufeng, et al., "MatchNet: Unifying Feature and Metric Learning for Patch-Based Matching", CVPR Paper, (2015), 3279-3286.

Kim, Hyunjik, et al., "Disentangling by Factorising", arXiv:1802.05983v3, (2019), 19 pgs.

Matsuo, Tadashi, et al., "Transform Invariant Auto-encoder", arXiv:1709.03754v1, (2017), 6 pgs.

Bengio, Y, et al., "Representation learning: A review and new perspectives", IEEE transactions on pattern analysis and machine intelligence, 35(8), (2013), 1798-1828.

Jing, Yushi, et al., "Visualrank: Applying PageRankto Large-Scale Image Search", IEEE Transactions on Pattern Analysis and Machine Intelligence, 30(11), (2008), 1877-1890.

Rajaraman, A, et al., "Chapter 3 Finding Similar Items", Mining of Massive Datasets, (2010), 55-111.

\* cited by examiner

TRANSFORM DISENTANGLING AUTO-ENCODER AND RELATED METHODS

TECHNICAL FIELD

Embodiments discussed herein regard devices, systems, and methods for improving machine learning techniques. Embodiments provide for improved encoder or decoder operations by separating static features from dynamic features and learning based on a mixture of the static and dynamic features. Static features are those that do not change under transformation. Dynamic features are those that change under transformation.

BACKGROUND

Prior work on feature disentangling has focused on ways to learn disentangled representations. One prior technique is proposed by Matsuo, et al. in "Transform Invariant Autoencoder", 2017. Matsuo's method trains an autoencoder to decode into a common representation that is invariant under transformation. Unlike approaches presented herein, in Matsuo, the transformational parameters are lost from the representation. The decoder of Matsuo reconstructs only a normalized form of the input and cannot reconstruct the original data. Embodiments herein overcome limitations of Matsuo and other prior disentangling techniques.

BRIEF DESCRIPTION OF THE DRAWINGS

FIG. 5 illustrates, by way of example, a logical block diagram of an embodiment of a system for object recognition, image matching, object matching, or the like.

DETAILED DESCRIPTION

Figure 1:
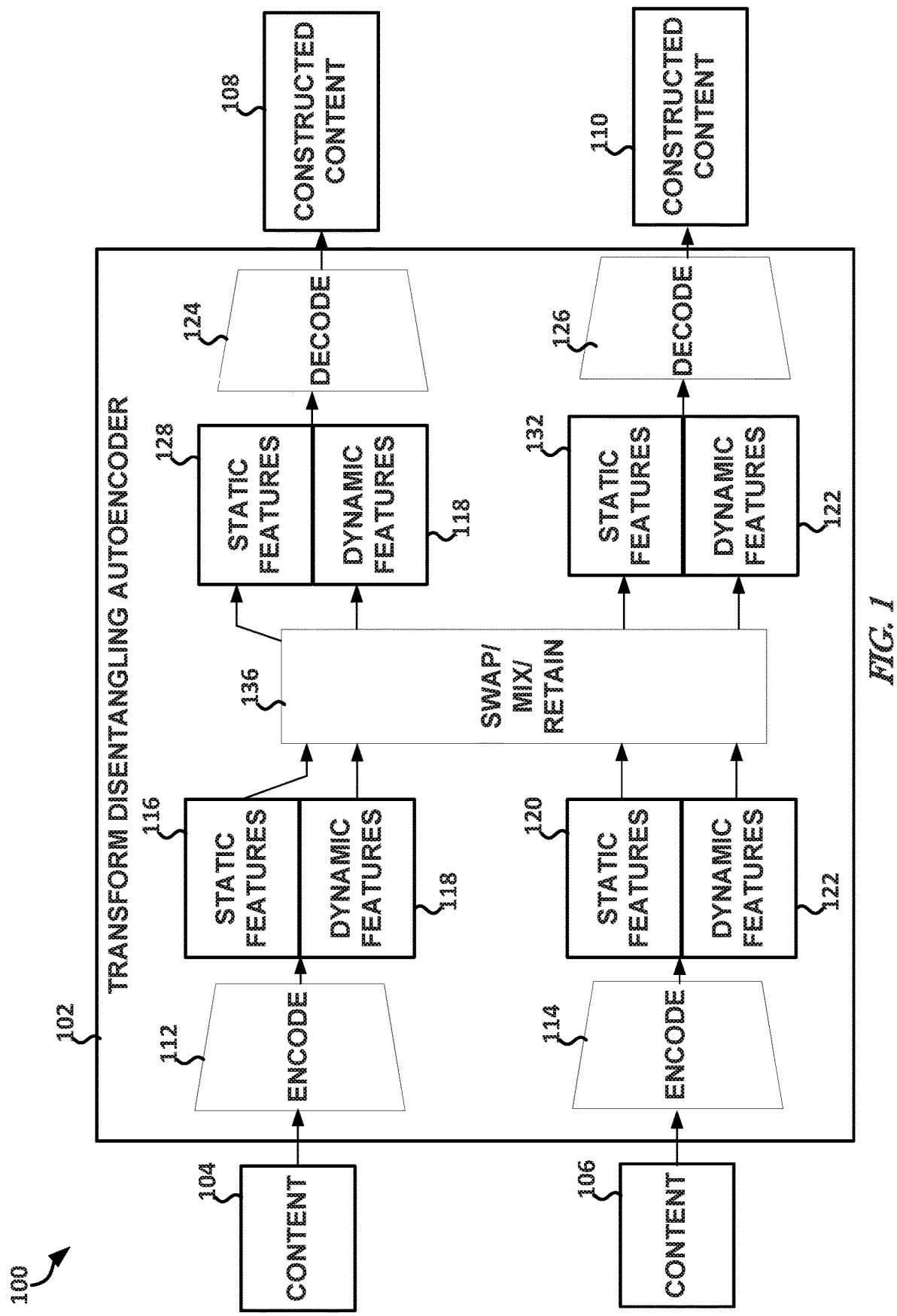
FIG. 1 illustrates, by way of example, a logical block diagram of an embodiment of a system including a transform disentangling autoencoder.

Deep learning (DL) methods employ multi-layered neural networks (NNs) based on simple models of biological neurons. DL is inspired by information known about how the brain processes. DL represents the latest insights derived from neuroscience. Connections between neural units in an NN are regulated by a set of weights, which form the parameters of a DL model.

Convolutional NNs (CNNs) are a type of NN that reduce the number of model parameters that must be fit to the data by replicating a smaller set of parameters across some dimension, most often spatially or temporally. This reduction in parameters reduces the tendency of a model to over-fit to a dataset, improving the model's ability to generalize. Most, if not all, state-of-the-art methods for image, audio, and text processing now leverage CNNs. Traditional CNNs include a fully connected network layer to aggregate spatial or temporal features and provide a single output for each data instance. In contrast, all layers of a Fully Connected CNN (FCNNs) are convolutional, allowing 1) variable sized input and output and 2) multiple outputs per data instance. For images or other content, this provides a field of output vectors for each piece of content, with each output vector representing the content within a spatial neighborhood. Embodiments can compute a locality sensitive hash (LSH) from each of these spatial outputs. This provides an ability to identify similar features at different locations within each image.

DL techniques are predominantly supervised, meaning they require labeled data. The training process for these techniques seeks to take data as input and adjust the model parameters to achieve an output matching a given set of labels. Data labeling is generally time consuming and manually intensive. In contrast, autoencoders (AEs) are a family of DL techniques using unsupervised learning to learn a low-dimensional feature representation of unlabeled data. An AE is comprised of an encoder and a decoder network transforming data respectively to and from this feature space. AEs differ by the type of networks used and the constraints placed on the latent feature representation used to encode the data. A Fully Convolutional Autoencoder (FCAE) depicted in FIG. 6 uses FCNNs for the AE encoder and decoder network to enable searching images by parts, improving detection of partial image matches, large-scale transformations and enables explainability in terms of combinations of matching local visual features.

Generative Adversarial Networks (GANs) provide another unsupervised approach for DL and use a pair of networks working in competition to synthesize data that reconstructs statistical properties of a given dataset. GANs are comprised of a generator, which is equivalent in function to the decoder network for an AE. Unlike an AE, a GAN lacks an encoder network to convert data samples back to its assumed latent space, but the generator network instead pairs with a critic network (also known as a discriminator) comparing generated samples to real samples from the dataset.

Some embodiments regard training an NN architecture to disentangle static features from dynamic features. Such disentangling provides improved encoding and decoding. Embodiments can retain both the static and dynamic features. Embodiments can be used for image matching or object recognition that is invariant to transformations to the object. The transformations can include rotation, scale, perspective (viewpoint), color, or other transformation that can be learned by an NN.

Embodiments can learn data representations that disentangle what is represented in the data from how it has been transformed or where it is located. Such representations can be useful for many type of problems including object identification and recognition, biometrics, two-dimensional (2D) to three-dimensional (3D) transformations, style transfers, synthesis, speaker identification, speech recognition, speech synthesis, and change detection. Disentangled representations are useful for many types of data including images, audio, text, or video. If applied to audio data containing speech, for example, applications include speaker identification, speech recognition, and speech synthesis, by disentanglement of how something is said from who said it and what was said. A style transfer applies a transform to data, giving the data a characteristic of other data. For example, a model can be trained on a set of paintings to determine characteristics (or a style) of a painting. One or more characteristics of the painting can then be applied to an image to make the image look as if it is painted. Synthesis is the ability to sample from a model to generate new data that has a statistical property that matches a statistical property learned from another data set. Synthesis is sometimes used to generate a texture to improve computer graphics. There is evidence that the brain has similar transformational processing to embodiments. The transformational processing of the brain has been described as "what" and "where" cortical pathways.

Embodiments can include training NN models that are capable of transforming data into representations which explicitly separate "what" is present in a data sample and "where" it is (or how it has been transformed). The "what" representational components, sometimes called static features, are invariant to transformation, and the "where" components, sometimes called dynamic features, can make explicit the parameters of the transformation.

Embodiments can train an NN on at least two data samples (for example, images or other files) that contain different transformations (e.g., transformational views in the example of images) of the same content. Such pairs can be constructed for many types of transformations, such as shift, scale, or rotation. In 3D, the data pairs can include the same objects under different lighting or viewpoint.

An autoencoder can be trained to encode data into a latent representation and decode back to the original data space. Learning can include obtaining network weights that minimize the error between the reconstructed data (output of the decoder) and the original data. In embodiments, the latent variables can be assigned as either invariant to transformation ("what" or static features) or non-invariant to transformation ("where" or dynamic features). Given a pair of samples that contain the same content under some transformation (e.g., rotated views of the same object), each sample can be encoded. The static feature components of two pieces of encoded content can be swapped, mixed, shuffled, or the like before decoding. The NN can be trained to minimize the reconstruction error of the reconstructions.

An advantage of the autoencoder of embodiments, is that it divides the representation into static and dynamic components, learning both parameters that are invariant to a given transformation and parameters that characterize the transformation. The autoencoder can be constrained to maintain these static and dynamic properties of these components by swapping or mixing components of pairs or groups of data samples that are known to vary only in specific ways (e.g., same content under different viewpoint). Unlike other approaches for invariant feature learning, the transformational parameters can be retained in the transformation.

FIG. 1 illustrates, by way of example, a logical block diagram of an embodiment of a system 100 including a transform disentangling autoencoder 102. The system 100 as illustrated includes content 104, 106 as input to the autoencoder 102. The autoencoder 102 can generate reconstructed content 108, 110 based on the content 104, 106, respectively.

The content 104, 106 can include an image (e.g., a color, black and white, infrared, nighttime, a video frame, or the like), a point set (e.g., a 2D or 3D point set) with or without intensity data, a document (e.g., a portable data format (pdf), text, word, or the like), or other data. The content 104, 106 can include a common object. The content 106 can include a transformed version of the content 104. The transform can include a rotation, scaling, viewpoint change, word change (without changing semantic meaning), color change, or the like.

An autoencoder, such as the autoencoder 102, learns to copy its input to its output. An autoencoder has an internal layer (a hidden layer) that describes a "code" (sometimes called a "feature vector" herein) used to represent the input. The autoencoder 102 includes an encoder 112, 114 that maps the content 104, 106 into the feature vectors 116, 118 and 120, 122, respectively. The autoencoder 102 includes a decoder 124, 126 that maps the feature vectors 116, 118 and 120, 122 to a reconstruction of the content 104, 106, respectively. The reconstruction of the content 104, 106 is illustrated as constructed content 108, 110 in FIG. 1.

The autoencoder 102 includes encoders 112, 114 that generate a latent feature vector for the content 104, 106. The latent feature vector for the content 104 includes static features 116 and dynamic features 118. Similarly, the latent feature vector for the content 106 includes static features 120 and dynamic features 122. The static features 116, 120 represent the "what" of the content. The "what" includes the object, such as a building, vehicle, person, weapon, foliage, window, door, road, word, meaning, or other object. The dynamic features 118 represent the transform of the object or other features of the content around the object.

In some embodiments, the autoencoder 102 can be a fully convolutional autoencoder. More details regarding the fully convolutional autoencoder are provided regarding FIG. 6, and elsewhere herein.

The static features 116 of the content 104 can be swapped, mixed, or the like with static features 120 of the content 106, such as by a swap/mix operation 136. Swapping includes replacing the static features 116 with the static features 120. In the FIG. 1, swapping the static features would make the static features 128 equal to the static features 120 and the static features 132 equal to the static features 116. The static features 128, 132 can be a mix of the static features 116, 120. Mixing can include determining a linear combination of the static features 116, 120. The linear combination can include a weighted average of the static features 116, 120. Swapping retains the marginal statistics of the features, but mixing can change the marginal statistics. For example, consider the feature vector {static 1, static 2, static 3, dynamic 1, dynamic 2, dynamic 3} and the feature vector {static 4, static 5, static 6, dynamic 4, dynamic 5, dynamic 6}. Swapping the static features generates the feature vectors {static 4, static 5, static 6, dynamic 1, dynamic 2, dynamic 3} and the feature vector {static 1, static 2, static 3, dynamic 4, dynamic 5, dynamic 6}. Mixing the feature vectors can generate, for example, any of the static features 116, 120 from swapping, not swapping, or linear combinations thereof. The dynamic features 118, 122 of the feature vectors can be maintained. The averaging performed by the mixing, along with the reconstruction loss term in the cost function, can help ensure that the autoencoder 102 learns to put invariant information in the static features 116, 120. An additional loss term in the cost function can serve the same purpose, such as by penalizing a difference between the static features for each pair.

The decoder 124, 126 can construct content 108, 110, respectively, based on the altered feature vectors. The altered feature vectors include swapped or mixed features. For example, the static features 120 from the content 106 and the dynamic features 118 from the content 104 form an altered feature vector. Many other altered feature vectors are possible.

A loss function used to train the autoencoder 102 can include one or more of a term representing the reconstruction loss between the content 104 and the constructed content 108, a term representing the reconstruction loss between the content 106 and the reconstructed content 110, or a term representing a difference between the static features 116 and the static features 120. The loss can include a mean square error (MSE), a root MSE (RMSE), mean absolute error (MAE), R squared (e.g., 1−MSE(model)/MSE (baseline)) or adjusted R squared, mean square percentage error (MSPE), mean absolute percentage error (MAPE), root mean squared logarithmic error (RMSLE), or the like between terms, In mathematical terms, the loss can be represented using Equation 1, where $A_i$ and $B_i$ represent a pair i of N pairs of data samples which have been formed by $B_i = F(A_i)$ for some transformative function F( ) $E(x)_{static}$ represents the static features extracted from x by the encoder network E, and a is an additional hyperparameter selected through model validation and tuning to adjust the relative weight of the loss terms:

$$\text{Loss} = \sum_{i=1}^{N} \|A_i - A'_i\| + \|B_i - B'_i\| + \alpha \|E(A_i)_{static} - E(B_i)_{static}\| \qquad \text{Equation 1}$$

where $A' = D(\lambda E(B)_{static}, (1-\lambda)E(A)_{static}, E(A)_{dynamic})$, D is the function applied by the decoder 116, 120, and λ is a linear mixing parameter (0 is no mixing, 1 is swapping).

The output of the encoder 112, 114 can be specified as a hyperparameter design choice. The autoencoder 102 designer can decide how many static features 116, 120 and how many dynamic features 118, 122 are to be encoded by the encoder 112, 114.

Using the system 100, the static and dynamic features of the content 104, 106 can be retained. This is distinct from prior work, such as Matsuo discussed in the Background, that does not retain the dynamic features. In Matsuo, the NN architecture forces values to decode to the same value without concern for transform. In contrast, the system 100 trains the autoencoder 102 to decode the combinations of dynamic and static features to different values. This is, at least in part, because the system 100 retains the variant portions of the feature vectors.

While the system 100 includes two content inputs and two content outputs, the system 100 can include more than two content inputs and outputs. The autoencoder 102 can swap or mix between the two or more latent feature vectors generated for the inputs.

Figure 2:
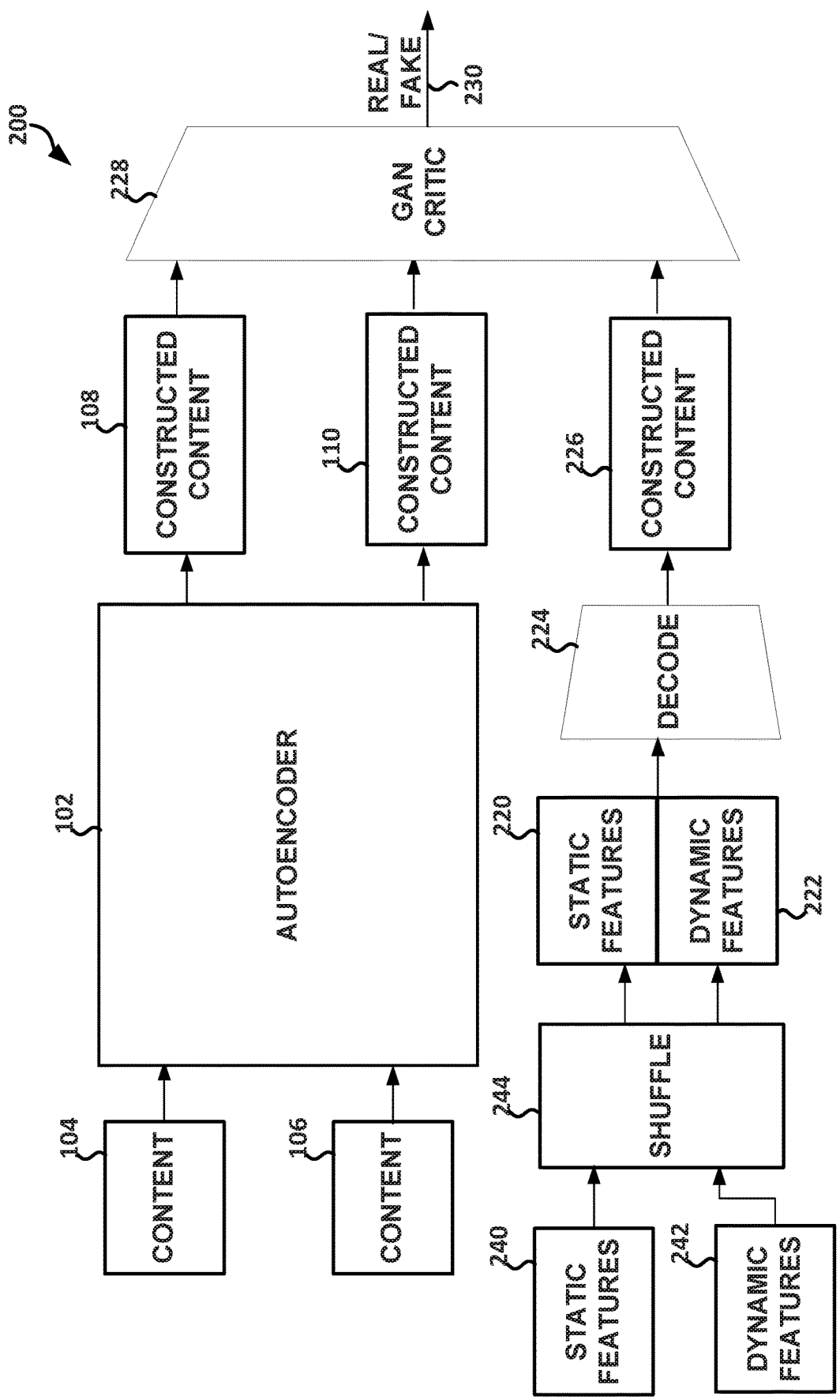
FIG. 2 illustrates, by way of example, a logical block diagram of an embodiment of another system for transform disentangling in an autoencoder.

FIG. 2 illustrates, by way of example, a logical block diagram of an embodiment of another system 200 for transform disentangling using an autoencoder 102. The system 200 includes a combination of an autoencoder 102 and a generative adversarial network (GAN) that is formed from the decoder 124, 126, 224 and the GAN critic 228. Disentanglement helps independently describe causal factors that give rise to the data. Some parts of the content are independent of transformation. These parts are static features. Other parts are dynamic features. The GAN can help the autoencoder 102 learn which features are static and which features are dynamic, and to learn both static and dynamic features that can be used independently from one another, sometimes called disentangling.

The system 200 as illustrated includes an additional decoder 224 that receives static features 220 and dynamic features 222 and generates constructed content 226. The decoder 224 can be same as the decoder 124, 126, which can be the same as each other. Same, in terms of the encoder and decoder means they share the same weights. The static features 220 and dynamic features 222 can be generated by sampling features from the latent feature vectors of the encoders 112, 114 (see FIG. 1). The reconstruction loss discussed regarding Equation 1 can be used to adjust weights of the encoder 112, 114 and decoder 124, 126, 224. The loss associated with the GAN critic 228 classification of the constructed content 108, 110, 226 can be a cross-entropy loss. The loss associated with the GAN critic 228 classification of the constructed content 108, 110, 226 can be used to adjust weights of the decoder 124, 126, 224. The critic loss (e.g., cross-entropy) can be used to adjust weights of the GAN, such as the decoder 124, 126, 224, or the GAN critic 228. GAN loss terms for the critic 228 and the decoder 124, 126, 224 can be additional terms of a loss function discussed previously. The decoder 124, 126, 224 can serve the function of the generator of a GAN that includes the GAN critic 228.

In training the GAN 228 two NNs contest with each other. Given a training set, a GAN learns to generate new data with the same statistics as the training set. For example, a GAN trained on images can generate new images that look at least superficially authentic to human observers, having some realistic characteristics.

In the system 200, the decoders 124, 126, 224 act as generators of the GAN. The GAN critic 228 classifies whether the constructed content 108, 110, 226 is real or fake 230. The cross-entropy loss of the classification can be used to adjust the weights of the GAN critic 228. The cross-entropy loss of the classification can be used to adjust weights of the decoders 124, 126, 224. Adjusting the weights of an NN is sometimes called backpropagation.

The static features 220 can include a batch shuffled version of the static features 116, 120 and dynamic features 118, 122. Batch shuffling can effectively sample from the autoencoder latent representations (the static features 116, 120 and dynamic features 118, 122). Sampling can be performed for a batch of data samples (usually 32 or more) by shuffling across the batch independently for each feature. This sampling can match the distribution of the input data if the representation is statistically independent (disentangled). That is, each feature varies independently from the other features. Batch shuffling does not alter the marginal statistics for each feature within the batch. The shuffled features can be reconstructed by the decoder 224 to generate fake data. The critic 228 can compare fake data (generated by sampling or shuffling the features) to reconstructed (and/or original, real data). The critic loss can be used to improve the ability of the critic 228 to discriminate between real and fake content. The generator loss can be used to improve the ability of the decoder 124, 126, 224 to confuse the critic, by making the fake content 226 more similar to real content 108, 110, and the features 220, 222 more disentangled. The autoencoder reconstruction loss terms can be used to make the encoder 112, 114 encode features that are more disentangled to match the features used by the decoder 124, 126, 224. The GAN generator and/or critic loss can be additional loss terms in the loss function (sometimes called a cost function).

The static features 220 and dynamic features 222 can be from a shuffle operation 244. The shuffle operation 244 can take prior computed static features 240 or dynamic features 242 as input. The static features 240 or dynamic features 242 can be output by the encoder 112, 114. The shuffle operation 244 can batch the static features 240 or dynamic features 242. Consider the feature vectors previously discussed, {static 1, static 2, static 3, dynamic 1, dynamic 2, dynamic 3} and {static 4, static 5, static 6, dynamic 4, dynamic 5, dynamic 6} and an additional feature vector {static 7, static 8, static 9, dynamic 7, dynamic 8, dynamic 9}. The shuffle operation 244 can batch the static features into corresponding feature sets {static 1, static 4, static 7}, {static 2, static 5, static 8}, {static 3, static 6, static 9} or the dynamic features into corresponding feature sets {dynamic 1, dynamic 4, dynamic 7}, {dynamic 2, dynamic 5, dynamic 8}, {dynamic 3, dynamic 6, dynamic 9}. The shuffle operation can select (e.g., randomly) a feature from each of the feature sets to generate the static features 220 or dynamic features 222. An example shuffled feature vector can include {static 1, static 8, static 6, dynamic 7, dynamic 2, dynamic 6}.

Figure 3:
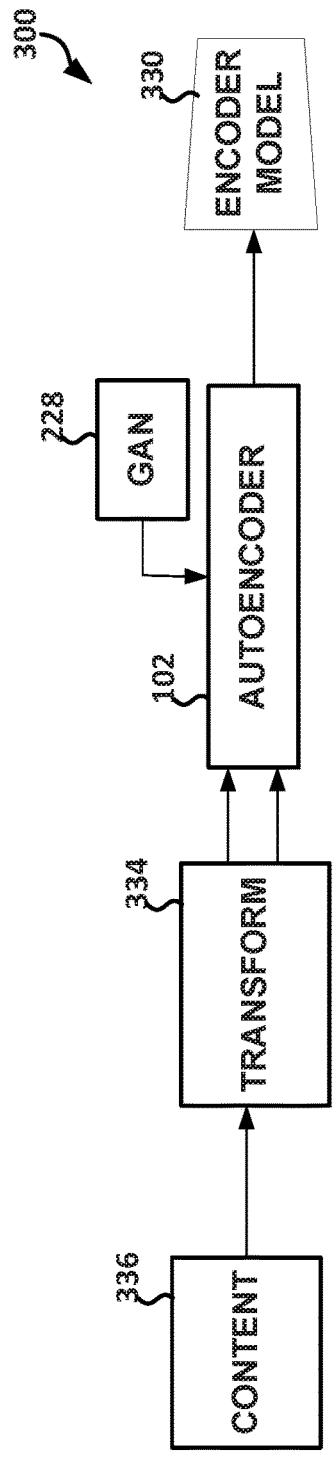
FIG. 3 illustrates, by way of example, a logical block diagram of an embodiment of a system for generating an encoder model.

FIG. 3 illustrates, by way of example, a logical block diagram of an embodiment of a system 300 for generating an encoder model 330. The system 300 receives content 336 as input and generates an encoder model 330 as output. While the example shows only content 336 as the input in the process of generating the encoder model 330 for simplicity, it should be appreciated that multiple content files and/or a database with a plurality of data samples may be used for generating the encoder model 330 in some embodiments. In some embodiments, content 336 includes a database, e.g., of images of stylized or non-stylized marks. The content 336 can be same as or similar to the content 104, 106. The content 336 can be operated on by a transform operation 334. The transform operation 334 can generate one or more transformed versions of the content 336. The transformed version can include the content 336 with the object rotated, from a different perspective, scaled, or the like. The transform operation 334 can include applying an affine transformation to the content 336.

The transformed content and the original content can be operated on by the autoencoder 102. The autoencoder 102 can be trained with or without the GAN. The trained autoencoder 102 provides a trained NN encoder model 330 and a trained NN decoder model. The trained NN encoder model 330 can be used for applications of embodiments. The trained NN encoder model 330 is trained, by adjusting NN weights based on a loss function, to encode the content 336 into a disentangled feature vector 444 (see FIG. 4) that includes disentangled static features and dynamic features.

Figure 4:
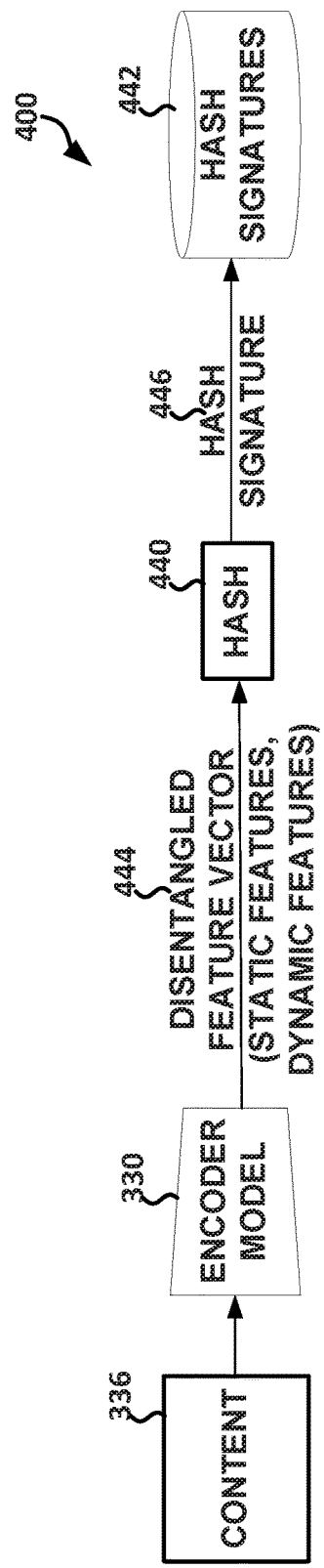
FIG. 4 illustrates, by way of example, a logical block diagram of an embodiment of a system for generating a hash signatures database.

FIG. 4 illustrates, by way of example, a logical block diagram of an embodiment of a system 400 for generating a hash signatures database 442. The system 400 can be used to generate a database of known static features (represented by the hash signatures database 442). The system 400 as illustrated includes the content 336, which can be the content 104, 106, 336 before or after the transformation operation 334, as input to the encoder model 330. The encoder model 330 generates the disentangled feature vector as discussed previously.

A hash operation 440 can be performed on the static features of the disentangled feature vector. The hash operation 440 can include a locality sensitive hash (LSH), a locality preserving hash (LPH), a spatial voting technique, or other similar operation. These operations map like data to a finite number of buckets. In these operations, collisions are much more frequent than in more typical hashing techniques that try to minimize the number of collisions. Examples of LSH techniques includes Nilsimsa Hash, TLSH, random projection (sometimes called "SimHash"), among others. LSH is a technique that aims to preserve local relations of data while reducing dimensionality of a dataset. Unlike cryptographic hashes, which seek to distribute hashes randomly, LSH functions are designed to hash similar objects to either the same hash, or to hashes close to one another as defined by some distance metric (e.g., a Hamming distance, or the like). Thus, LSH aims to maintain relative distances between high-dimensional data points in a low-dimensional hash space. Google's original VisualRank method uses LSH with the Scale-Invariant Feature Transform (SIFT) for image similarity ranking. Unlike VisualRank, embodiments approach image search and similarity ranking using features obtained through recent deep learning advancements including convolutional NNs (CNNs), AEs, and GANs rather than SIFT.

The hash signatures from the hash operation can be stored in a hash signatures database 442. The hash signatures database 442 can include the hash signature 446 associated with an identifier (e.g., a unique identifier) of one or more pieces of the content 104, 106, 336 to which the hash signature is mapped. Pieces of the system 400 can be used to perform an image comparison, object recognition, or the like.

Figure 5:
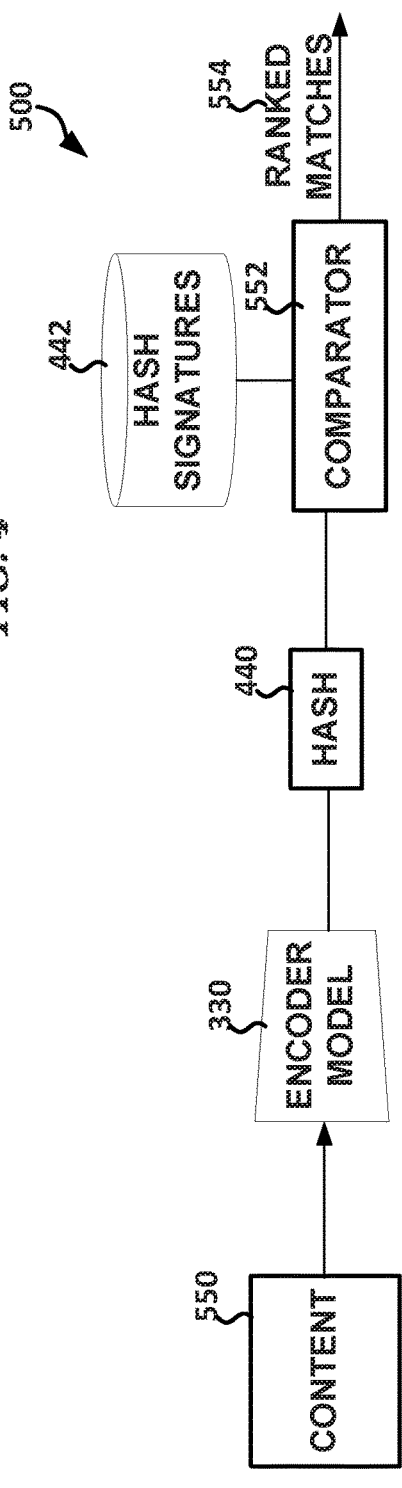

FIG. 5 illustrates, by way of example, a logical block diagram of an embodiment of a system 500 for object recognition, image matching, object matching, or the like. The system 500 as illustrated includes content 550 (same or different to the content 104, 106, 336) as input and ranked matches 554 as output. The encoder model 330 generates the disentangled feature vector 444 for the content 550. The hash operation 440 determines one or more hash values for the static features of the disentangled feature vector 444. The one or more hash values are then compared to hash values of the hash signatures database 442 by a comparator 552. The comparator 552 can determine a distance between the one or more hash values of the static features of the content 550 and the closest hash values of the hash signatures database 442. The comparator 552 can generate ranked matches 554. The ranked matches 554 can indicate which hash signatures are nearest to the hash signature of the content 550. The comparator 552 can provide a confidence score that is determined based on the distance. The smaller the distance, the higher the confidence score.

Using the systems 300, 400, 500 of FIGS. 3-5, respectively, an image matching network can be realized. The system 500 can be trained as discussed previously and provides rank ordering and filtering of a database of images (e.g., the signatures database 442), where the images are ordered or filtered based on their similarity to a query image (e.g., the content 550). The automation of visual search is provided through the building of the hash signatures database 442 and use of the trained encoder model 330. The system 500 accounts for potential visual differences between the query specimen and the images within the database 442, including cases in which only some visual concepts match between two images, as would occur when part of one image has been removed, was extracted from the other, or text or other conceptual portions have been added to one of the images. The system 500 can identify a similarity despite potential differences due to scale, rotation, skew or other standard transformation. Embodiments can provide an explanation of any decisions made based on this search process and avoid the opaqueness common to many AI "black box" solutions.

The encoder model 330 can include convolutional feature descriptors describing abstract visual concepts invariant to specified transformations including translation, scale, rotation, shear, skew, or the like. These feature descriptors can be computed at multiple spatial locations within each content 104, 106, 336, which allows content to be compared based on their salient parts, an approach that addresses challenges for partial image matching and provides the ability to explain image similarity in terms of individual visual concepts. Scalability of search comparisons can be made possible by applying the hashing operation 440 to the disentangled feature vector 444

The same encoder model 330 can be applied to extract visual features at each location within the content 550 and the same hash operation 440 can be performed to identify hash values. The hash values 446 can be compared to identify nearest neighbors within the LSH signature database 442. The resulting matches can be then aggregated to provide a summary match score, rank potential image matches and display these to an interested party. To increase matching accuracy, standard optical character recognition (OCR) methods can be used to identify and potentially remove or ignore regions of the content 104, 106, 336, 550 containing text.

As previously discussed, the autoencoder 102, in some embodiments, can be a fully convolutional autoencoder. More details regarding this are provided regarding FIG. 6.

Figure 6:
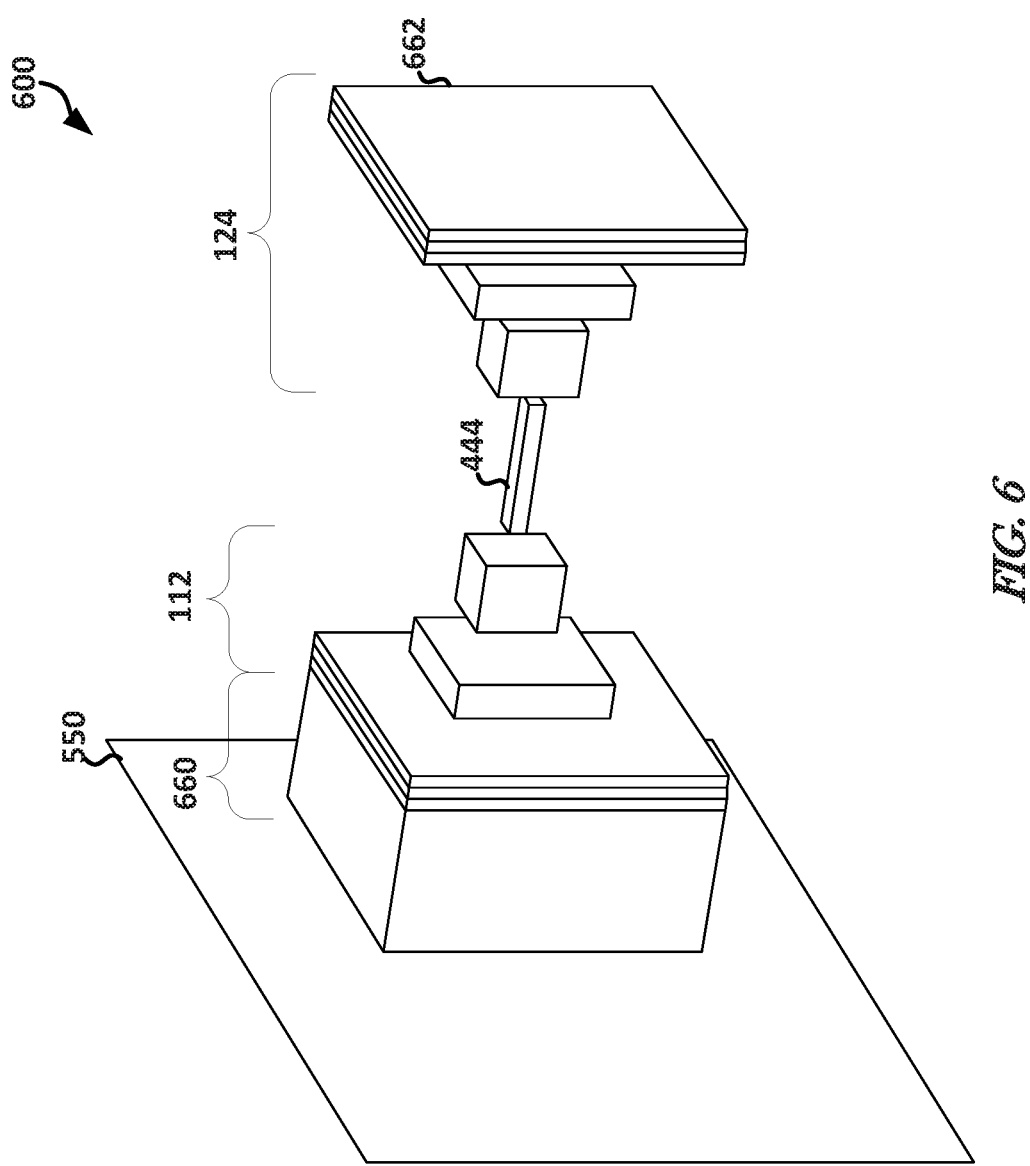
FIG. 6 illustrates, by way of example, a logical block diagram of an embodiment of a fully convolutional autoencoder (FCAE).

FIG. 6 illustrates, by way of example, a logical block diagram of an embodiment of a fully convolutional AE (FCAE) 600. The FCAE 600 includes the encoder 112 and the decoder 124. The encoder 112 and the decoder 124, in the example of FIG. 6, are fully convolutional. The FCAE 600 takes a subset 660 of the content 550 as an input. The FCAE 600 includes the encoder 112 and the decoder 124. The encoder 112 generates the disentangled feature vector 444. The decoder 124 attempts to reconstruct the subset of the content, illustrated as constructed content 662. The subset 660 of the content 550 can be a patch of the content 550. The subset 660 of the content 550 can include contiguous pixels for a specified number of rows and columns of the content 550. The subset 660 of the content 550 can be used to generate a disentangled feature vector 444 for the subset 660 of the content 550. The static portion of the feature vectors 444 the subset 660 of the content 550 can be respectively hashed and aggregated to form a hash signature for the content 550.

The convolutional layers of the FCAE can be downsampled (as depicted for the encoder 112), or upsampled (as depicted for the decoder 124). Alternatively, the convolutional layers of the FCAE can remain fully sampled without downsampling or upsampling.

To achieve state-of-the-art performance, DL solutions can rely on a highly complex network of weights and functional transformations that do not lend themselves to human interpretation. The same can be true for biological neural networks, including the human brain. However, humans possess the capacity to identify reasons (felt, but albeit not provable) why two images appear similar or dissimilar in terms of specific visual patterns. It is this type of explanation which can be desired: one with which a human can resonate in order to explain why one determination occurred over another. Some have argued that you cannot have both high recognition accuracy and explainability, as the complexity of the solution to automate what a human perceptual system would achieve demands a sufficiently complex, and therefore equally opaque, solution. However, embodiments address this dilemma by hashing features extracted using NNs to identify matches between visual concepts at multiple locations within each image. The proposed approach enables an explanation as to which of the respective parts of each image were considered similar and the relative degree of similarity, not unlike the type of explanation a human might offer. Shown in Table 1 is a notional example of the type of explanation provided by embodiments.

TABLE 1

| Explanation Provided by Embodiments | |
|---|---|
| Sub-Image | Match Score |
| Patch 1 | 0.86 |
| Patch 2 | 0.95 |
| Patch 3 | 0.75 |
| Patch 4 | 0.87 |
| Patch 5 | 0.93 |
| Patch 6 | 0.89 |

An overall match score can be determined based on the individual match scores of the patches. The overall match score can include an average, a weighted average, or some other mathematical combination of the individual match scores.

DL, like embodiments, learn features directly from a dataset using CNN or other models. This approach is in contrast to traditional computer vision methods based on extraction and comparison of manually constructed features, such as Sobel edge detectors, Harris corner detectors, Hough and other transforms. In recent years, computer vision benchmarks have illustrated the benefits of deep learning approaches over these traditional methods in terms of performance and accuracy for many object and image recognition tasks, due to the ability of DL CNNs to learn highly robust and complex image features beyond those constructed by hand. Additionally, traditional methods are often prone to scalability issues, have difficulty coping with noise, and cannot easily be tuned for performance for specific problem sets.

Some approaches use DL networks to compute a similarity or distance metric between two input images. Instead, embodiments focus on learned distributed representations invariant to various feature transformations, such as scale, rotation and color, and independently represent unique characteristics comprising each image using reduced dimensional vectors derived from different regions of the input. This permits efficient and scalable implementations using hash tables based on the learned representation. In contrast, solutions focusing on direct comparison of images using NNs do not scale well to large datasets, as they require network models to be computed for every instance in the database for every search. Other techniques may achieve invariance to scale and rotation in a brute force manner, through repeated comparisons under multiple transformations. However, the number of such combinations of transformations to compare becomes readily intractable.

Other LSH approaches generate a single hash per image. Such methods encounter difficulty addressing challenges, such as a need to identify related images based on similarity found only between parts of each respective image (e.g., where relevant portions of one image match a cropped region of the other image or text has been superimposed).

Embodiments provide a way to evaluate images based on local regions within each image, by hashing multiple features within each image.

In a variational autoencoder (VAE), the output is usually a Gaussian, specified by a unit mean and variance for each component, but can be another statistical distribution specified by other parameters. The autoencoder 102 in embodiments is not a VAE and the output of the autoencoder 102 is not constrained to a probability distribution.

Figure 7:
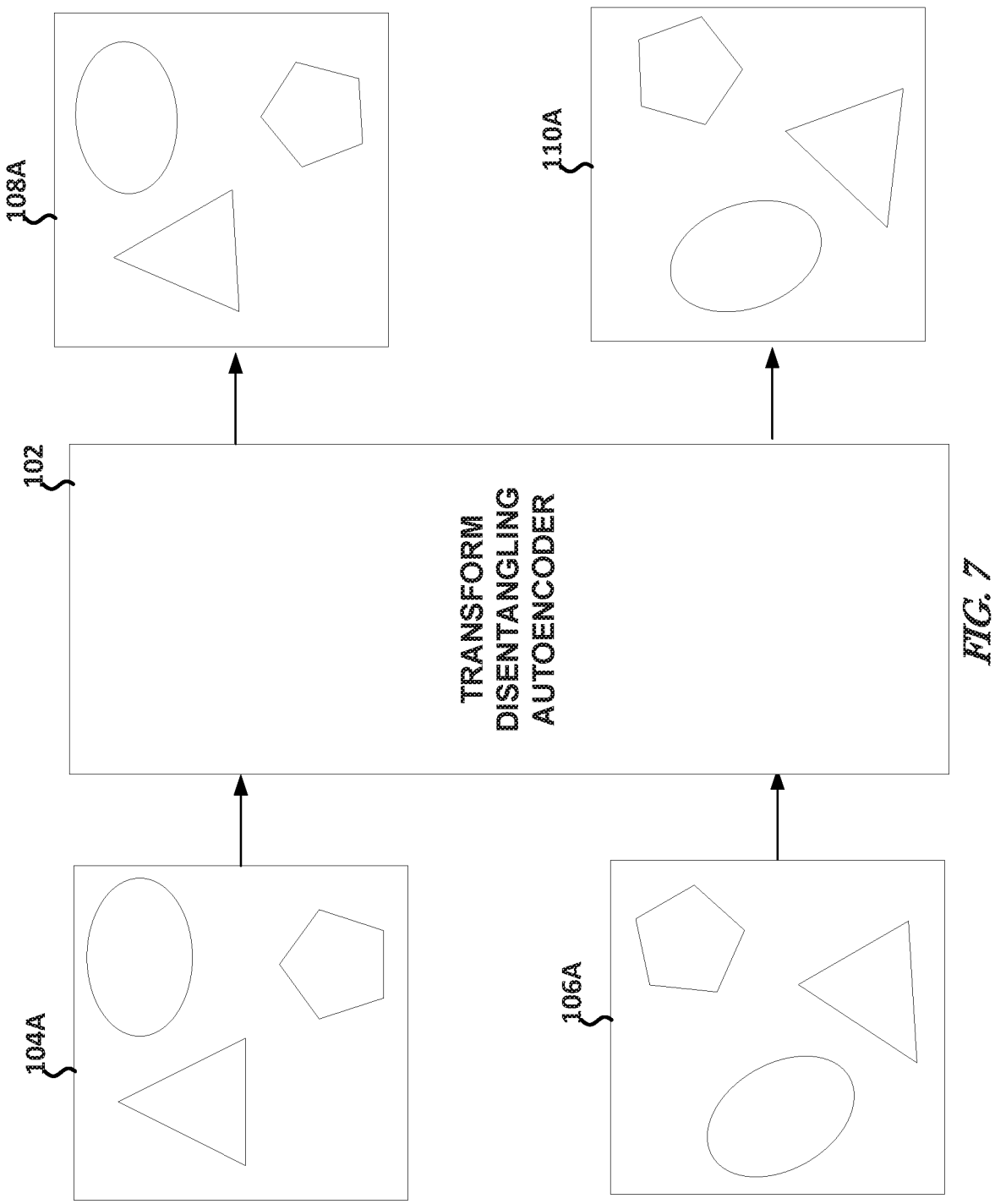
FIG. 7 illustrates, by way of example, a diagram of an embodiment of a use case of the transform disentangling autoencoder.

FIG. 7 illustrates, by way of example, a diagram of an embodiment of a use case of the transform disentangling autoencoder 102. In FIG. 7 content 104A, 106A (specific instances of content 104, 106, respectively) in the form of images are input to the autoencoder 102. The autoencoder 102 determines latent feature vectors that include static and dynamic features. The autoencoder 102 mixes or swaps static features of the content 104A and 106A. The autoencoder 102 then attempts to reconstruct the content 104A, 106A and generates constructed content 108A, 110A. A goal of the autoencoder 102 can be to separate static features of the content 104A, 106A from the dynamic features of the content 104A, 106A. If the autoencoder 102 is successful in this, the content 108A will construct to look the same as the content 104A and the content 110A will construct to look the same as the content 106A. In the example of FIG. 7, the autoencoder 102 has not totally disentangled the dynamic and static features, as the rotations of the objects of the content 104A relative to the content 106A appear to affect the constructed content 108A, 110A. While FIG. 7 is an example of using the autoencoder 102 on image content, the autoencoder 102 can operate on other content, such as audio, text, or the like.

Figure 8:
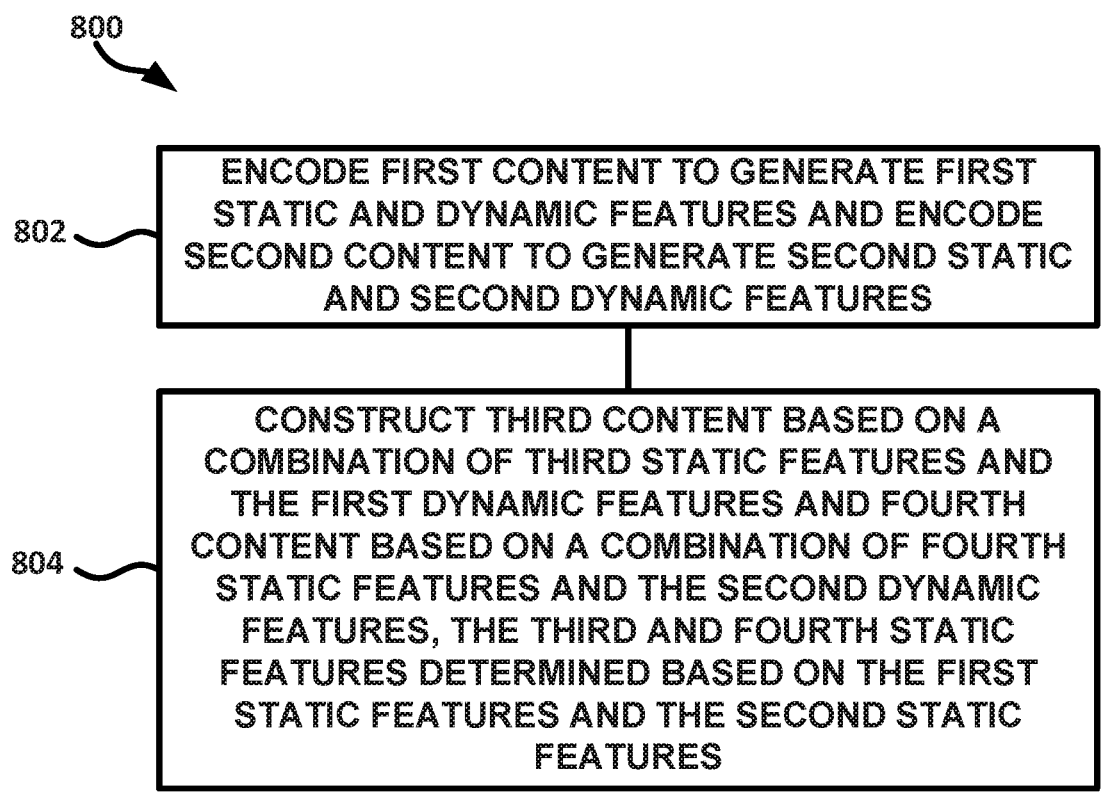
FIG. 8 illustrates, by way of example, a diagram of an embodiment of a method for disentangling static features and dynamic features of content.

FIG. 8 illustrates, by way of example, a diagram of an embodiment of a method 800 for disentangling static and dynamic features. The method 800 can be implemented using one or more of the components of FIGS. 1-7 and 9. The method 800 as illustrated includes encoding, by the AE 102, first content 104 to generate first static features 116 and first dynamic features 118 and second content 106 to generate second static features 120 and second dynamic features 122, at operation 802; and constructing, by the AE 102, third content 108 based on a combination of third static features 128 and the first dynamic features 118 and fourth content 110 based on a combination of fourth static features 132 and the second dynamic features 134, the third and fourth static features 128, 132 being determined based on the first static features 116 and the second static features 120, at operation 804.

The method 800 can further include swapping or mixing, by the AE 102, one or more static features of the second static features 120 with one or more static features of the first static features 116 to generate the third static features 128 and the fourth static features 132. The method 800 can further include training the AE using two or more images of an object, one of the two or more images including a transformed version of the object relative to at least one other image of the other two or more images. Training the AE 102 can further include reducing a loss function that accounts for generation loss between the first content 104 and the third content 108, and generation loss between the second content 106 and the fourth content 110. The loss function can further include a difference between the first static features 116 and the second static features 120.

The method 800 can further include generating, using a generative adversarial network (GAN), fifth content 226 based on a combination of the first and second static features 116, 120 and the first and second dynamic features 118, 122, and classifying, by the GAN, whether the third, fourth, and fifth content are real or fake. Generating the fifth content 226 can further include shuffling individual static features of the first and second static features 116, 120. The method 800 can further include training the AE 102 based on the classification.

The method 800 can further include, wherein the AE 102 is fully convolutional. The method 800 can further include determining respective hash values 220 of the first static features 116 and the second static features 120 and storing the hash values 440 in a memory 442. The method 800 can further include encoding, by the AE, fifth content to generate third static features 220. The method 800 can further include determining a second hash value of the third static features 220. The method 800 can further include comparing the second hash value to respective hash values of the first and second static features 116, 120 to determine whether the fifth content 226 is like the first content 104 or the second content 106.

Figure 9:
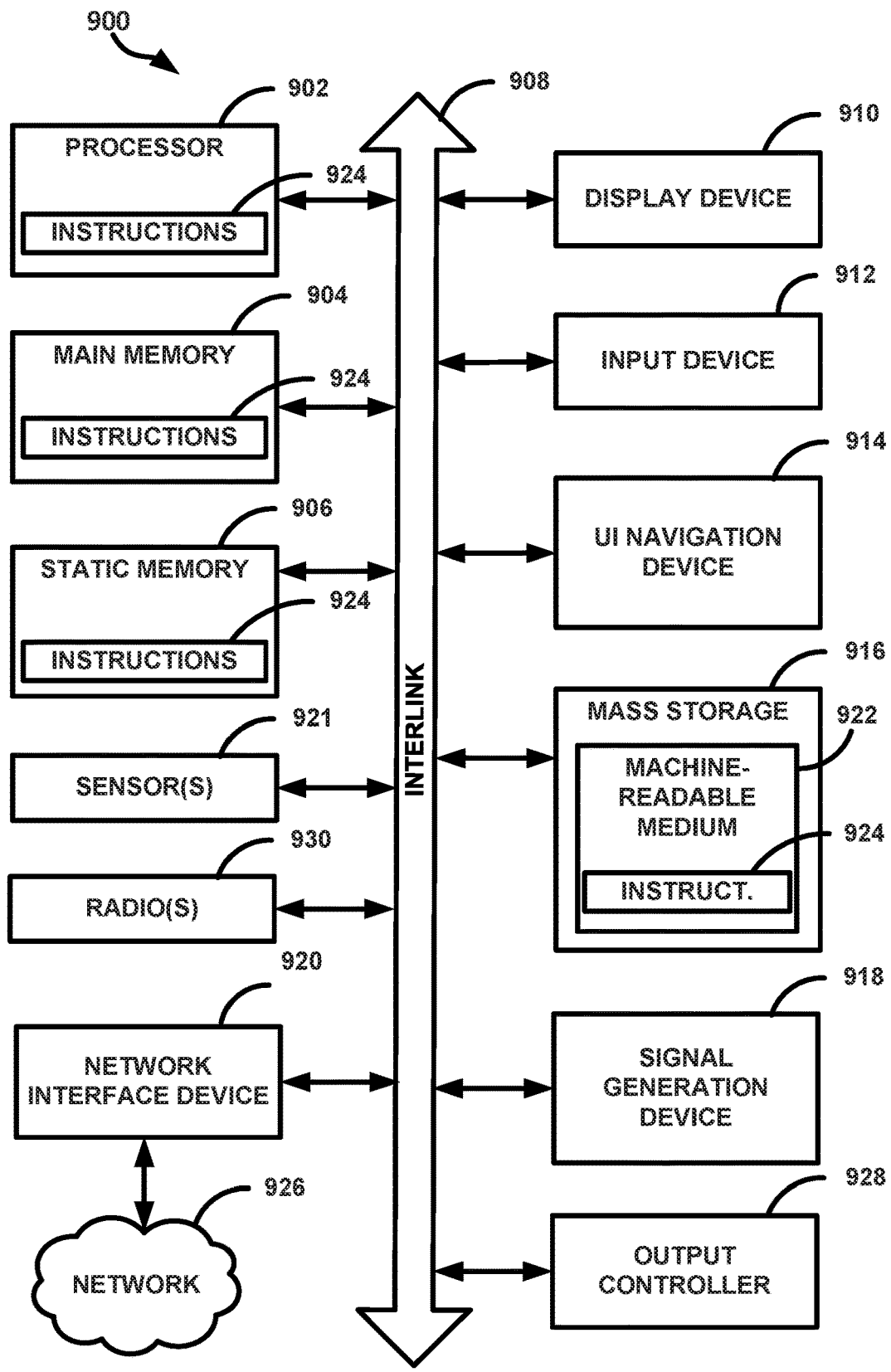
FIG. 9 illustrates, by way of example, a block diagram of an embodiment of a machine in the example form of a computer system within which instructions, for causing the machine to perform any one or more of the methods discussed herein, may be executed.

FIG. 9 illustrates, by way of example, a block diagram of an embodiment of a machine in the example form of a computer system 900 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a mass storage unit 916, a signal generation device 918 (e.g., a speaker), a network interface device 920, and a radio 930 such as Bluetooth, WWAN, WLAN, and NFC, permitting the application of security controls on such protocols.

The mass storage unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Examples

Example 1 can include a computer-implemented method for disentangling static features and dynamic features of content using an autoencoder (AE), the method comprising encoding, by the AE, first content to generate first static features and first dynamic features and second content to generate second static features and second dynamic features, and constructing, by the AE, third content based on a combination of third static features and the first dynamic features and fourth content based on a combination of fourth static features and the second dynamic features, the third and fourth static features being determined based on the first static features and the second static features.

In Example 2, Example 1 can further include swapping or mixing, by the AE, one or more static features of the second static features with one or more static features of the first static features to generate the third static features and the fourth static features.

In Example 3, at least one of Examples 1-2 can further include training the AE using two or more images of an object, one of the two or more images including a transformed version of the object relative to at least one other image of the other two or more images.

In Example 4, Example 3 can further include, wherein training the AE includes reducing a loss function that accounts for generation loss between the first content and the third content, generation loss between the second content and the fourth content.

In Example 5, Example 4 can further include, wherein the loss function further includes a difference between the first static features and the second static features.

In Example 6, at least one of Examples 1-5 can further include generating, using a generative adversarial network (GAN), fifth content based on a combination of the first and second static features and the first and second dynamic features, and classifying, by the GAN, whether the third, fourth, and fifth content are real or fake.

In Example 7, Example 6 can further include, wherein generating the fifth content includes shuffling individual static features of the first and second static features.

In Example 8, at least one of Examples 6-7 can further include training the AE based on the classification.

In Example 9, at least one of Examples 1-8 can further include, wherein the AE is fully convolutional.

In Example 10, at least one of Examples 1-9 can further include determining respective hash values of the first static features and the second static features and storing the hash values in a memory.

In Example 11, Example 10 can further include encoding, by the AE, fifth content to generate third static features, determining a second hash value of the third static features, and comparing the second hash value to hash values of the first and second static features to determine whether the fifth content is like the first content or the second content.

Example 12 can include a non-transitory machine-readable medium including instructions that, when executed by a machine, cause the machine to perform operations for disentangling static features and dynamic features of content, the operations comprising encoding, by an autoencoder (AE), first content to generate first static features and first dynamic features and second content to generate second static features and second dynamic features, and constructing, by the AE, third content based on a combination of third static features and the first dynamic features and fourth content based on a combination of fourth static features and the second dynamic features, the third and fourth static features being determined based on the first static features and the second static features.

In Example 13, Example 12 can further include, wherein the operations further comprise swapping or mixing, by the AE, one or more static features of the second static features with one or more static features of the first static features to generate the third static features and the fourth static features.

In Example 14, at least one of Examples 12-13 can further include, wherein the operations further comprise training the AE using two or more images of an object, one of the two or more images including a transformed version of the object relative to at least one other image of the other two or more images.

In Example 15, Example 14 can further include, wherein training the AE includes reducing a loss function that accounts for generation loss between the first content and the third content, generation loss between the second content and the fourth content.

In Example 16, Example 15 can further include, wherein the loss function further includes a difference between the first static features and the second static features.

Example 17 includes a system for disentangling static features and dynamic features of content, the system comprising a memory including instructions stored thereon, processing circuitry configured to execute the instructions, the instruction, when executed by the processing circuitry, cause the processing circuitry to implement a transform disentangling autoencoder (AE) that encodes first content to generate first static features and first dynamic features and second content to generate second static features and second dynamic features, and constructs third content based on a combination of third static features and the first dynamic features and fourth content based on a combination of fourth static features and the second dynamic features, the third and fourth static features being determined based on the first static features and the second static features.

In Example 18, Example 17 can further include, wherein the instructions include further instructions that cause the processing circuitry to implement a generative adversarial network (GAN) that generates fifth content based on a combination of the first and second static features and the first and second dynamic features, and classify whether the third, fourth, and fifth content are real or fake.

In Example 19, Example 18 can further include, wherein generating the fifth content includes shuffling individual static features of the first and second static features.

In Example 20, at least one of Examples 18-19 can further include, wherein the instructions include further instructions that cause the processing circuitry train the AE and GAN based on the classification.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method for disentangling static features and dynamic features of content using an autoencoder (AE), the method comprising:
    encoding, by the AE, first content to generate first static features and first dynamic features and second content to generate second static features and second dynamic features; and
    constructing, by the AE, third content based on a combination of third static features and the first dynamic features and fourth content based on a combination of fourth static features and the second dynamic features, the third and fourth static features being determined based on the first static features and the second static features, the third static features different from the fourth static features.

2. The method of claim 1, further comprising swapping, by the AE, one or more static features of the second static features with one or more static features of the first static features to generate the third static features and the fourth static features.

3. The method of claim 1, further comprising training the AE using two or more images of an object, one of the two or more images including a transformed version of the object relative to at least one other image of the other two or more images.

4. The method of claim 3, wherein training the AE includes reducing a loss function that accounts for generation loss between the first content and the third content, generation loss between the second content and the fourth content.

5. The method of claim 4, wherein the loss function further includes a difference between the first static features and the second static features.

6. The method of claim 1, further comprising generating, using a generative adversarial network (GAN), fifth content based on a combination of the first and second static features and the first and second dynamic features, and classifying, by the GAN, whether the third, fourth, and fifth content are real or fake.

7. The method of claim 6, wherein generating the fifth content includes shuffling individual static features of the first and second static features.

8. The method of claim 6, further comprising training the AE based on the classification.

9. The method of claim 1, wherein the AE is fully convolutional.

10. The method of claim 1, further comprising determining respective hash values of the first static features and the second static features and storing the hash values in a memory.

11. The method of claim 10, further comprising:
    encoding, by the AE, fifth content to generate third static features;
    determining a second hash value of the third static features; and
    comparing the second hash value to hash values of the first and second static features to determine whether the fifth content is like the first content or the second content.

12. A non-transitory machine-readable medium including instructions that, when executed by a machine, cause the machine to perform operations for disentangling static features and dynamic features of content, the operations comprising:
    encoding, by an autoencoder (AE), first content to generate first static features and first dynamic features and second content to generate second static features and second dynamic features; and
    constructing, by the AE, third content based on a combination of third static features and the first dynamic features and fourth content based on a combination of fourth static features and the second dynamic features, the third and fourth static features being determined based on the first static features and the second static features, the third static features different from the fourth static features.

13. The non-transitory machine-readable medium of claim 12, wherein the operations further comprise swapping, by the AE, one or more static features of the second static features with one or more static features of the first static features to generate the third static features and the fourth static features.

14. The non-transitory machine-readable medium of claim 12, wherein the operations further include training the AE using two or more images of an object, one of the two or more images including a transformed version of the object relative to at least one other image of the other two or more images.

15. The non-transitory machine-readable medium of claim 14, wherein training the AE includes reducing a loss function that accounts for generation loss between the first content and the third content, generation loss between the second content and the fourth content.

16. The non-transitory machine-readable medium of claim 15, wherein the loss function further includes a difference between the first static features and the second static features.

17. A system for disentangling static features and dynamic features of content, the system comprising:
a memory including instructions stored thereon;
processing circuitry configured to execute the instructions, the instruction, when executed by the processing circuitry cause the processing circuitry to implement a transform disentangling autoencoder (AE) that:
encodes first content to generate first static features and first dynamic features and second content to generate second static features and second dynamic features; and
constructs third content based on a combination of third static features and the first dynamic features and fourth content based on a combination of fourth static features and the second dynamic features, the third and fourth static features being determined based on the first static features and the second static features, the third static features different from the fourth static features.

18. The system of claim 17, wherein the instructions include further instructions that cause the processing circuitry to implement a generative adversarial network (GAN) that generates fifth content based on a combination of the first and second static features and the first and second dynamic features, and classify whether the third, fourth, and fifth content are real or fake.

19. The system of claim 18, wherein generating the fifth content includes shuffling individual static features of the first and second static features.

20. The system of claim 18, wherein the instructions include further instructions that cause the processing circuitry train the AE and GAN based on the classification.

* * * * *